(12) United States Patent
Huang

(10) Patent No.: US 9,792,466 B2
(45) Date of Patent: Oct. 17, 2017

(54) LUMP SEQUENCES FOR MULTI-TRACK MAGNETIC STRIPE ELECTRONIC DATA TRANSMISSION

(71) Applicant: Samsung Pay, Inc., Burlington, MA (US)

(72) Inventor: Enyang Huang, Andover, MA (US)

(73) Assignee: Samsung Pay, Inc., Burlington, MA (US)

(*) Notice: Subject to any disclaimer, the term of this patent is extended or adjusted under 35 U.S.C. 154(b) by 0 days.

(21) Appl. No.: 15/147,493

(22) Filed: May 5, 2016

(65) Prior Publication Data

US 2017/0200027 A1    Jul. 13, 2017

Related U.S. Application Data

(60) Provisional application No. 62/276,604, filed on Jan. 8, 2016.

(51) Int. Cl.
*G06K 7/08* (2006.01)
*G06K 9/03* (2006.01)

(52) U.S. Cl.
CPC ............. *G06K 7/084* (2013.01); *G06K 9/03* (2013.01)

(58) Field of Classification Search
CPC ................. G06K 9/03; G06K 7/084
USPC ................................. 235/449, 493
See application file for complete search history.

(56) References Cited

U.S. PATENT DOCUMENTS

| 8,727,219 B1* | 5/2014 | Mullen | G06K 19/06196 235/380 |
| 2014/0006277 A1* | 1/2014 | Rao | G06Q 20/341 705/41 |
| 2015/0271150 A1* | 9/2015 | Barnett | H04L 63/0435 713/171 |

* cited by examiner

*Primary Examiner* — Toan Ly
(74) *Attorney, Agent, or Firm* — Seyfarth Shaw LLP; Brian Michaelis

(57) ABSTRACT

A system and method of validating electronic encoded information from magnetic stripe card data transmitted as electronic stripe data includes a lump transmission stream. The lump transmission stream is read by at least two track channel readers each of which recognizes and reads only data corresponding to data to be read from a respective magnetic stripe represented in the lump transmission stream, which has data read from two tracks of magnetic card stripes. One track channel reader reads the first portion of the lump stream and discards the second portion of the stream, the second track channel reader reads the second portion of the stream and discards the first portion of the stream.

20 Claims, 7 Drawing Sheets

FIG. 1
PRIOR ART

LUMP SEQUENCES FOR MULTI-TRACK MAGNETIC STRIPE ELECTRONIC DATA TRANSMISSION

CROSS-REFERENCE TO RELATED APPLICATION DATA

This application claims priority from U.S. Provisional Patent Application No. 62/276,604 filed Jan. 8, 2016, which is incorporated herein in its entirety.

FIELD

The present invention relates to systems and methods for validating electronic encoded information on a magnetic stripe card.

BACKGROUND

Reading of magnetic stripe card data has been done primarily by swiping the magnetic stripe against the reader head of a magnetic stripe reader (MSR). The movement of the card causes the magnetic domains contained in the stripe to induce voltages in the reader head. Data on magnetic stripes is contained in discrete tracks (channels) whose content and format are mutually incompatible. These tracks are spaced closely to each other. Magnetic stripe readers contain multiple track reader channels, where the read head's individual pick-up inductors are precisely lined up with the corresponding tracks on the magnetic stripe. Each reader channel only "sees" the data from its corresponding magnetic stripe track.

A typical magnetic stripe with its tracks is described with reference to FIG. 1. As illustrated, the three tracks of data, which are encoded directly to magnetic stripe 11, are labeled as 101, 102, and 103. The magnetic stripe is located 0.223 inches from the edge of the card and each of three tracks is 0.110 inches wide. The track 101 is typically recorded at 210 bits per inch with a maximum data length of 79 characters. The track 101 was developed by the International Air Transaction Association (IATA) and contains 7-bit alphanumeric characters for automation of airline ticketing or other transactions where a reservation database is accessed. The track 102 typically has a recording density of 75 bits per inch with a maximum data length of 40 characters. The track 102 was developed by the American Bankers Association (ABA) and contains 5-bit numeric characters for the automation of financial transactions. This track of information is also used by most systems that require an identification number and other control information. The track 103 was developed by e Thrift Industry and is virtually unused by the major worldwide card processing/payment networks.

FIG. 2 shows an example data structure stored on the track 101 of a payment card. Track 101 can include the following fields (in this order):

SS|FC|PAN|FS|Name|FS|Additional Data|Discretionary Data|ES|LRC|.

Start Sentinel (SS) indicates the beginning of the data structure and is set to the character "%".

Field Code (FC) is set with one character and indicates the card type. Primary Account Number (PAN) is set to the credit/debit card number and is always numerical up to 19 digits. Field Separator (FS) delimits different fields and is set to the character "^". Name represents the name of a particular card account holder and is alphanumerical up to 26 characters. Additional Data includes information about card expiration date and types of charges being accepted, where date format is YYMM. Discretionary Data includes card verification information. End Sentinel (ES) indicates the end of the data structure and is set to the character "?". Longitude Redundancy Check (LRC) is used to verify that the track 101 was read accurately.

With reference now to FIG. 3, an exemplary data structure stored on the track 102 of the payment card is illustrated. The data layout here slightly differs from the track 101 but is as follows:

SS|PAN|FS|Additional Data|Discretionary Data|ES|LRC|.

Start Sentinel (SS) indicates the beginning of the data structure and is set to the character ";".

Primary Account Number (PAN) is set to the credit/debit card number and is always numerical up to 19 digits. Field Separator (FS) delimits different fields and is set to the character "=".

Additional Data and Discretionary Data are similar to the data described in FIG. 2 with respect to track 101. As introduced in FIG. 2, End Sentinel (ES) here indicates the end of the data structure and Longitude Redundancy Check (LRC) is used to verify that the track 102 was read accurately.

FIG. 4 illustrates a block diagram of a typical magnetic stripe card reader with two read heads as may be typically installed on most Point Of Sale (POS) terminals to read payment cards. The magnetic stripe reader includes a Track 1 read head 401 and a Track 2 read head 402. Although not shown, in operation, the stripe 11 is inserted into a slot in a housing of the POS terminal and is swiped or passed by the two read heads. As the magnetic stripe 11 is passed by the two read heads, a first read head 401 reads data stored in the track 101 and a second read head 402 reads data stored in the track 102. Then reader software typically installed in the POS terminal processes the data received from the read heads 401, 402. Disadvantageously, the data on the magnetic stripe is static and subject to copying and fraud.

In recent years, to eliminate the fraud associated with static magnetic stripe cards, electronic cards and magnetic contactless methods have been developed that employ electronically simulated magnetic stripes that can transmit dynamic card data that is less susceptible to copying fraud. On traditional magnetic stripes the fields associated with each track of data are narrow and confined to the reading aperture of the corresponding read head channel. Both simulated electronic magnetic stripes and magnetic transmissions have wider fields that often leak into the adjacent track pick-up channel. Because the different tracks' data are encoded differently and are mutually incompatible, the leakage of the specific track's magnetic fields into an adjacent track read head causes reading errors. For example, the data (7-bit) stored in the track 101 leaks into the track 102 channel and is read by the read head 202, where the parsing software that is expecting 5-bit characters, will indicate an error. Conversely, when the track 102 data leaks into the track 101 channel, the encoding and the LRC will be wrong. Some POS reader software is unable to handle these exception conditions and terminates the transaction in error, or at least displays error messages that can confuse operators and/or consumers. Because of the close proximity of the tracks in a standard card and because of a lack of standardization in card readers, the leakage of the wrong track data into an adjacent channel is very difficult to prevent.

SUMMARY

The present disclosure describes a system and method to respond to the leak issues and resolve problematic magnetic stripe reading errors caused by electronic transmission of electronic stripe data, thereby improving business performance of POS magnetic stripe reading devices reading electronic cards or magnetic contactless payment devices that employ electronically simulated magnetic stripes. The systems and methods for overcoming the track data leakage problem disclosed herein combine both track channels' data into a single "lump" transmission that enables reader software to accept only the pertinent portion of the corresponding part of the lump data without detecting an error condition.

In general, in one aspect of the disclosure, the system and method aggregates multiple streams of data into a single lump stream. The reader software of a specific track channel will accept the "appropriate" part of the lump transmission and will ignore the "inappropriate" part. Track 1 reader software will find and read only the track 1 data of the lump transmission, discarding the track 2 data as noise. Similarly, the Track 2 reader software will see the track 1 data as noise but will correctly pick up the track 2 data.

In general, in another aspect of the disclosure, multiple data sources/tracks are combined in reverse order. The Track 1 reader software will first find and read a start signal of the track 1 data. After the Track 1 reader software finishes reading an ending signal of the data, the system accepts the data if the data is valid. In contrast, the Track 2 reader software will first find and read an ending signal of the track 2 data. After the Track 2 reader software finishes reading a start signal of the track 2 data, the system accepts the data upon approving its validity.

Embodiments of devices, systems, and methods are illustrated in the figures of the accompanying drawings, which are meant to be exemplary and non-limiting, in which like references are intended to refer to like or corresponding parts, and in which:

BRIEF DESCRIPTION OF THE DRAWINGS

Figure 1:
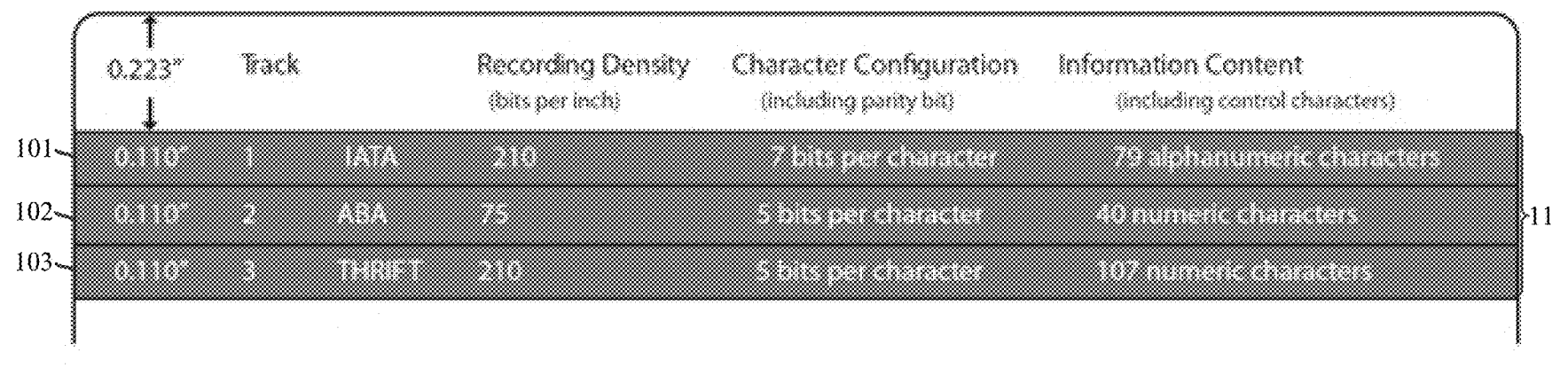

FIG. 1 illustrates a typical magnetic stripe with its tracks according to the prior art;

DETAILED DESCRIPTION

Detailed embodiments of the systems and methods are disclosed herein, however, it is to be understood that the disclosed embodiments are merely exemplary of the systems and methods, which may be embodied in various forms. Therefore, specific functional details disclosed herein are not to be interpreted as limiting, but merely as a basis for the claims and as a representative basis for teaching one skilled in the art to variously employ the systems and methods disclosed herein.

The present disclosure generally provides systems and methods for validating data encoded in magnetic stripe tracks. The disclosed system receives data from various tracks and combines them, for transmission as electronically simulated magnetic stripes, into a single lump transmission for reading by the respective read heads of a POS terminal. For example, a Magnetic Stripe ("Magstripe") Simulating Device includes Track 1 data and Track 2 data, which is securely stored. The Track 1 and Track 2 data are converted for safe storage into individual bit streams (zeros (0) and ones (1)), which are each started with leading zeros (i.e., clock bits). The Track 1 bit stream with leading zeros is transmitted into and stored in the Magstripe Simulating Device and followed by trailing zeros (i.e., clock bits), which are followed in secure storage by the leading zeros of the Track 2 bit stream and the Track 2 data. Trailing zeroes are then stored at the end of the Track 2 bit stream A typical single lump transmission consists of at least two different tracks of formatted data combined in the lump transmission, which is separated by clock bits.

Figure 3:
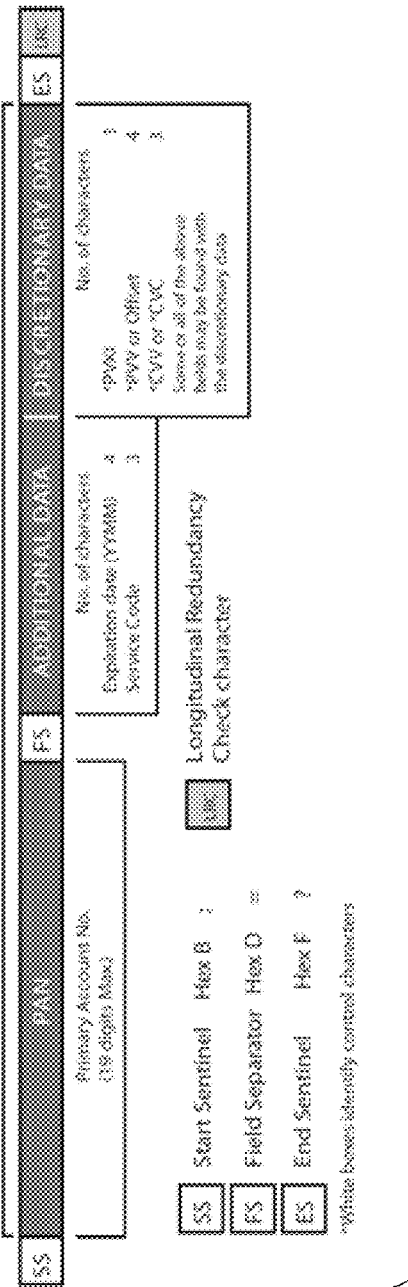
FIG. 3 illustrates data format encoded on the second track of the magnetic stripe of FIG. 1 according to the prior art.
Figure 2:
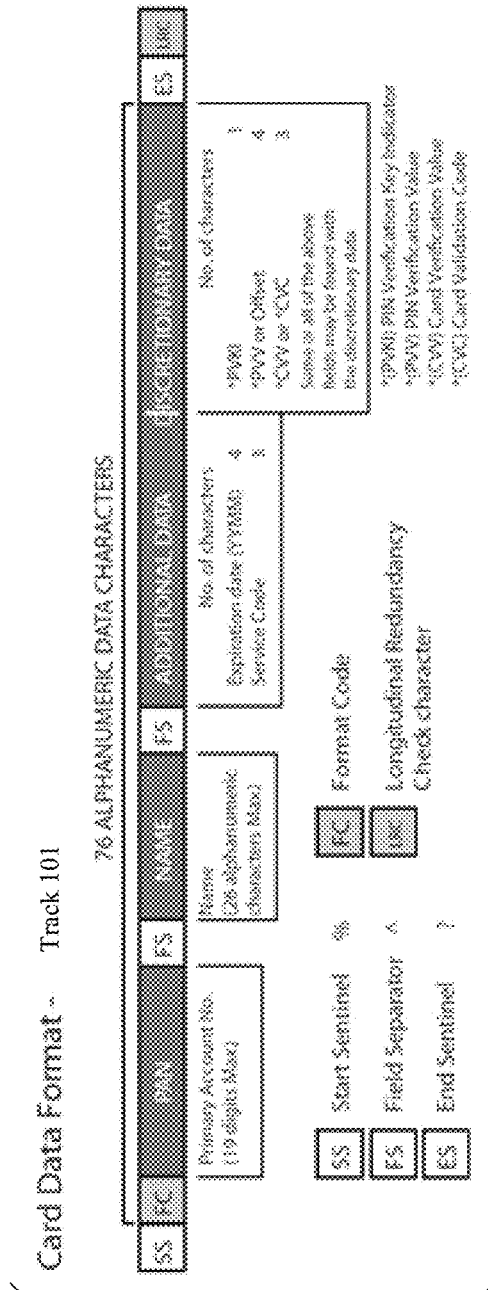
FIG. 2 illustrates data format encoded on the first track of the magnetic stripe of FIG. 1 according to the prior art.
Figure 4:
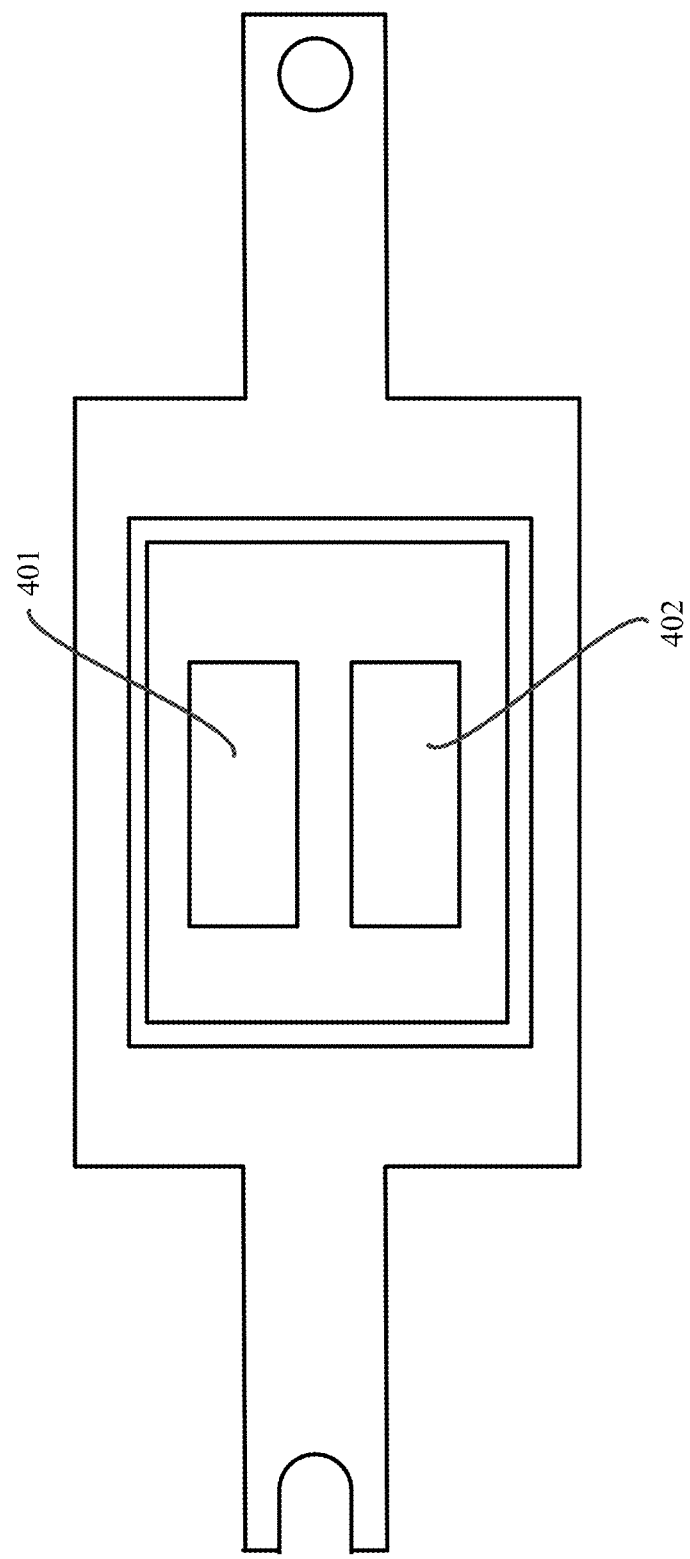
FIG. 4 illustrates a typical two track magnetic stripe reader head according to the prior art.
Figure 5:
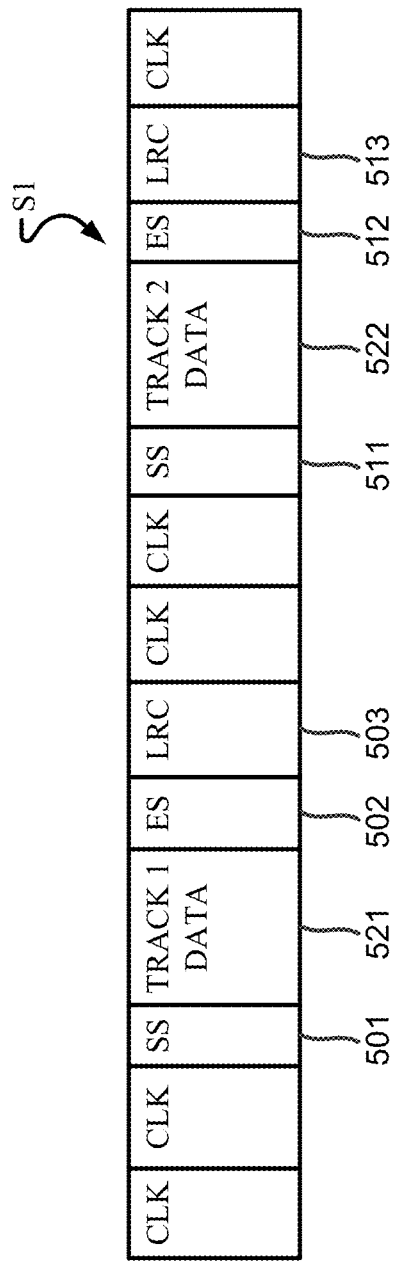
FIG. 5 illustrates a combined lump transmission consisting of the first track data followed by the second track data according to the present disclosure.

With reference to FIG. 5, in an illustrative embodiment, generally a lump transmission stream of electronically simulated magnetic stripes from electronic cards or magnetic contactless payment devices (collectively referred to herein as "electronic mag stripe device") that employ electronically simulated magnetic stripes for transmission to a POS terminal, contains two different types of data, track 1 data 521 and track 2 data 522. A clock (zero character stream) will be kept running between the two different tracks, which will each be encoded according to rules appropriate for that track. When an electronic mag stripe device is held proximate to the POS terminal read heads (analogous to passing a magnetic card with stripes through card stripe read heads of a POS terminal), the read heads pick up the raw data of the track 1 and 2 in the electronically simulated magnetic stripes. Then the raw data is transmitted to a decoder, where the raw data is decoded. The decoded track 1 and track 2 data are forwarded by the POS terminal to be further processed in the payment network as the track 1 and track 2 data decoded from the single lump transmission stream 51 (for example, as described herein below with respect to FIGS. 6A and 6B). As mentioned above, the Lump stream is a bit stream of zeros and ones that contains two formats, one is Track 1 format, which is 7 bits per character; the other one is Track 2 format, which is 5 bits per character. The Magstripe reader channels will look for their desired track encoding methods.

As illustrated in FIG. 5 the lump data stream comprises a track 1 Start Sentinel (SS) 501 followed by the entirety of Track 1 data 521, as described hereinbefore. A track 1 End Sentinel (ES) 502 follows the Track 1 data 521. The Track 1 data 521 End Sentinel 502 is followed by a track 1 data Longitudinal Redundancy Check field (LRC) used to check validity of the Track 1 data that was read. The clock stream 504 running between the track data follows the Track 1 LRC. Serially following the clock stream is a track 2 Start Sentinel 511. Track 2 data 522 follows the track 2 Start Sentinel 511. A track 2 End Sentinel 512 indicates the end of the Track 2 data 522. A track 2 data Longitudinal Redundancy Check field 513 follows the track 2 End Sentinel to facilitate validity checking of the Track 2 data that was read.

Figure 6A:
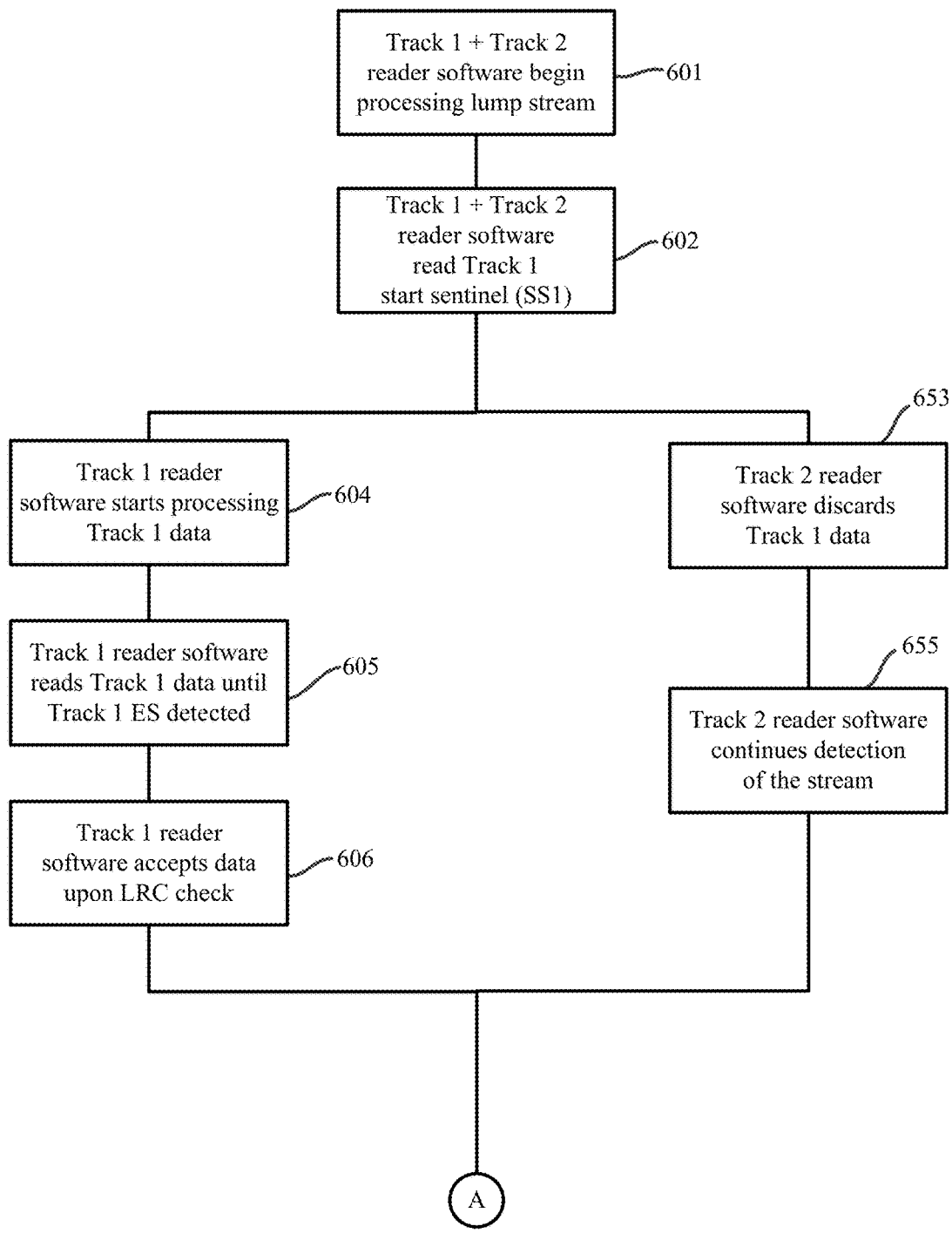
FIGS. 6A and 6B are flow diagrams illustrating Point of Sale (POS) reader software operation for reading lump data according to the present disclosure.

As illustrated in FIG. 6A, the lump stream 51 is further processed 601 by track 1 reader software and track 2 reader software installed in the memory of the POS terminal. Track 1 reader software only processes Track 1 data 521 and track 2 reader software only processes Track 2 data 522. When track 1 reader software and track 2 reader software process the lump stream 51 from the electronic mag stripe device, they both read 602 the track 1 Start Sentinel (SS) 501. The track 1 SS 501 indicates the following data is track 1 data specified to be accepted by the Track 1 reader software, not by the track 2 reader software. The track 2 reader software discards 653 the track 1 data 521 by not parsing it and continues detection 655 looking for Track 2 data 522. Once the track 1 SS 501 is verified to be acceptable for reading by the track 1 reader software, the track 1 reader software starts to parse 604 the track 1 data 521. The track 1 reader software stops parsing 606 the Track 1 data when the reader encounters the track 1 End Sentinel (ES) 502. The Track 1 reader software will accept 608 the data as valid if Longitude Redundancy Check (LRC) 503 shows no error is detected.

Figure 6B:
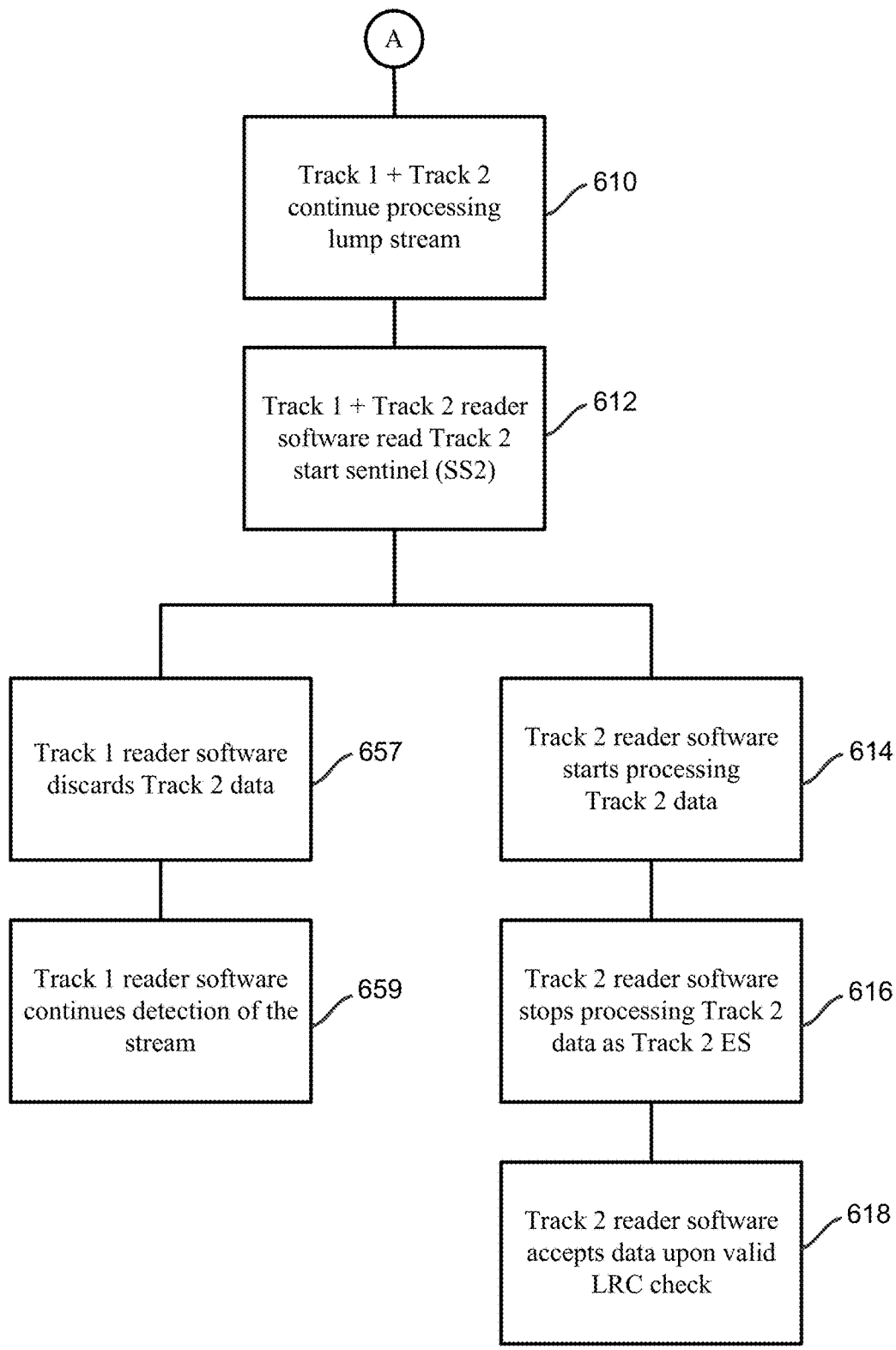

Referring now to FIG. 6B, Track 1 reader software and Track 2 reader software continue detecting/processing 610 the lump stream. When they both read 612 the track 2 Start Sentinel (SS) 511, the character indicates the data that follows is track 2 data only to be accepted by the Track 2 reader software. When the Track 2 data is detected, the Track 1 reader software discards 657 the track 2 data by not parsing it, but continues detection 659 of the data stream (it should be appreciated that the track 1 and track 2 reader software could be configured to discontinue processing or detection when it is not processing data appropriate to its respective read head). Once the Start Sentinel (SS) 511 is detected and data format is verified to be acceptable by the Track 2 reader software, its software starts to parse 614 the track 2 data 522. The Track 2 reader software stops parsing 616 the track 2 data when it encounters the track 2 End Sentinel (ES) 512. The Track 2 reader software will accept 618 the track 2 data as valid if Longitude Redundancy Check (LRC) 513 shows no error is detected. If LRC does not validate Track 1 Data or Track 2 Data it will result in an error and error message.

Figure 7:
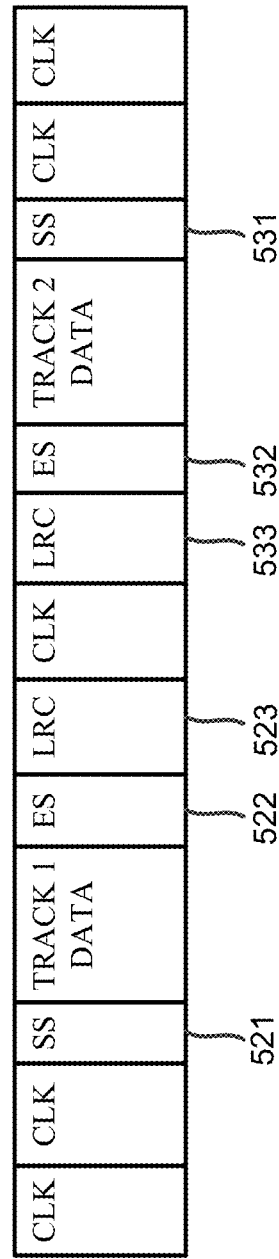
FIG. 7 illustrates a combined lump transmission consisting of the first track data followed by the second track data transmitted in reverse order according to the present disclosure.

In a further illustrative embodiment, as shown in FIG. 7, the combined lump transmission consists of Track 1 data followed by Track 2 data transmitted in reverse order. This embodiment according to the disclosure also takes advantage of the fact that all card readers are able to read a card swiped in either direction, i.e. either "forward" or "backwards".

In the reversed part of the lump, the Longitude Redundancy Check (LRC) 533 is the first character transmitted, followed by the End Sentinel (ES) 532, followed by the data, followed by the Start Sentinel (SS) 531. Since most readers look for a track Start Sentinel at either end of the bit stream, the reverse order of Track 2 data results in the Start Sentinel residing at the end of the bit stream. When receiving the lump transmission, the Track 1 reader software will recognize the Track 1 data SS 521. The Track 1 reader software starts to parse the track 1 data until the ES 522 is reached. The Track 1 data will be accepted as valid when the LRC 523 is verified. At the same time, the Track 2 reader software, which does not parse the Track 1 data, keeps waiting for a valid Track 2 data. Because the clock is kept running between the Track 1 data and Track 2 data of the lump, the Track 2 reader software will keep searching for the signal of SS or ES in the lump. When the Track 2 reader software detects the valid ES 532 of the Track 2 data, it starts parsing the data that follows after the ES 532 until it detects the SS 531, at which point it stops reading. Once the LRC 533 is verified, the Track 2 type data is accepted as valid.

While the systems and methods disclosed herein have been described and illustrated in connection with certain embodiments, many variations and modifications will be evident to those skilled in the art and may be made without departing from the spirit and scope of the disclosure. The disclosure is thus not to be limited to the precise details of methodology or construction set forth above as such variations and modification are intended to be included within the scope of the disclosure.

What is claimed is:

1. A system for validating electronically simulated magnetic stripe information on a point of sale (POS) device based on electronic encoded information from a magnetic stripe card, the POS device comprising:
   a first track channel reader comprising a first read head positioned to read first track data from the magnetic stripe data card;
   a second track channel reader comprising a second read head positioned to read second track data from the magnetic stripe data card; and
   a memory having installed therein:
      first track reader software that configures the POS device to read the first track data received by the first read head, and
      second track reader software that configures the POS device to read the second track data received by the second read head,
   wherein, in response to the first head and the second read head both receiving a data transmission stream forming the electronically simulated magnetic stripe information and having a first portion and a second portion, the first portion having data read from the first track of the magnetic stripe card, the second portion having data read from the second track of the magnetic stripe card, the first track reader software reads the first portion of the data transmission stream and discards the second portion of the data transmission stream, and the second track reader software reads the second portion of the data transmission stream and discards the first portion of the data transmission stream.

2. The system of claim 1 wherein the first portion data and the second portion data have different bit sizes.

3. The system of claim 1 wherein the first portion data is separated with the second portion data by at least a clock signal bit.

4. The system of claim 1 wherein at least one portion data includes a start signal bit and an end signal bit.

5. The system of claim 4 wherein the portion data having the start and end signal bits is parsed only after at least one of these signal bits was read.

6. The system of claim 1 wherein the first portion data includes only numeric characters.

7. The system of claim 1 wherein the second portion data includes both alpha and numeric characters.

8. The system of claim 1 wherein the first portion data and the second portion data are transmitted in reverse order.

9. A method of validating electronic encoded information from a magnetic stripe card, comprising:
   storing in a memory of a magnetic stripe transmission device a lump transmission stream having a first portion string and a second portion string, the first portion string being data from a first track of the magnetic stripe card, and the second portion being data from a second track of the magnetic stripe card;
   transmitting from the memory of the magnetic transmission device the lump transmission stream stored in the memory of the magnetic stripe transmission device to a Point Of Sale (POS) terminal to be picked up by a first read head and a second read head of the POS terminal, the transmitting of the lump transmission stream stored in the memory resulting in the POS terminal reading the first portion string received by the first read head and discarding the second portion received by the first read head and reading the second portion string received by the second read head and discarding the first portion received by the second read head.

10. The method of claim 9 wherein the first portion string and the second portion string have different bit sizes.

11. The method of claim 9 wherein the first portion string is separated with the second portion of string by at least a clock signal bit.

12. The method of claim 9 wherein at least one portion string includes a start signal bit and an end signal bit.

13. The method of claim 12 wherein the portion string having the start and end signal bits is parsed only after at least one of these signal bits was read.

14. The method of claim 9 wherein the first portion string includes only numeric characters.

15. The method of claim 9 wherein the second portion string includes both alpha and numeric characters.

16. The method of claim 9 wherein the first portion string and the second portion string are transmitted in reverse order.

17. A method for validating electronically simulated magnetic stripe information based on electronic encoded information from a magnetic stripe card, the method comprising the steps of:
  receiving, by a first read head and a second read head of a point of sale (POS) device, a data transmission stream forming the electronically simulated magnetic stripe information, the received data transmission stream having a first start sentinel preceding a first portion and a first end sentinel indicating the end of the first portion, the received data transmission stream further having a second start sentinel preceding a second portion and a second end sentinel indicating the end of the second portion;
  reading, by the POS device, the first portion received by the first read head;
  discarding, by the POS device, the second portion received by the first read head;
  reading, by the POS device, the second portion received by the second read head; and
  discarding, by the POS device, the first portion received by the second read head.

18. The method of claim 17 wherein reading the first portion of the data transmission stream comprises reading data encoded from a first track of the magnetic stripe card, and reading the second portion of the data transmission stream comprises reading data from a second track of the magnetic stripe card.

19. The method of claim 17 wherein the discarding of the second portion of the data transmission stream is based on the bit size of the second portion of the data transmission stream, and the discarding of the first portion of the data transmission stream is based on the bit size of the first portion of the data transmission stream.

20. A magnetic stripe transmission device, comprising:
  a memory storing a first track of magnetic stripe card data bits in said magnetic stripe transmission device,
  the memory storing a second track of magnetic stripe card data bits in said magnetic stripe transmission device,
  the memory further storing a lump transmission stream, the lump transmission stream having a first portion string and a second portion string, the first portion string being data bits from the first track of the magnetic stripe card, and the second portion being data bits from a second track of the magnetic stripe card;
  a clock generating an electronic signal timing the transmission of the lump transmission stream from the memory of the magnetic stripe transmission device to a Point Of Sale (POS) terminal to be picked up by a first read head and a second read head of the POS terminal, the POS terminal reading the first portion string received by the first read head and discarding the second portion received by the first read head and reading the second portion string received by the second read head and discarding the first portion received by the second read head.

* * * * *